July 12, 1932.   R. H. ROSENBERG   1,867,540
METHOD OF FORMING UNIVERSAL JOINTS
Filed Feb. 12, 1930

INVENTOR.
RALPH H. ROSENBERG.
BY
ATTORNEY.

Patented July 12, 1932

1,867,540

UNITED STATES PATENT OFFICE

RALPH H. ROSENBERG, OF DETROIT, MICHIGAN, ASSIGNOR TO BUDD WHEEL COMPANY, OF PHILADELPHIA, PENNSYLVANIA, A CORPORATION OF PENNSYLVANIA

METHOD OF FORMING UNIVERSAL JOINTS

Application filed February 12, 1930. Serial No. 427,725.

My invention relates to a universal joint and to a method of forming such a joint. In my prior application Serial No. 424,519, filed January 30, 1930, I have disclosed a universal joint having telescoping driving and driven members connected by a rubber sleeve which effects a driving connection between these members. The object of my present invention is to provide an improved method of assembling the parts of a universal joint of this type and of treating the rubber driving member to give it the desired resiliency, and improved bonding of the parts.

I have achieved this object by assembling the driving and driven members in concentric spaced relationship in a vulcanizing mold, filling the space between them with raw rubber and vulcanizing the rubber in this position in order to give it the desired characteristics. My invention further contemplates a distortion of one of said members to give it the desired final form and simultaneous distortion of the vulcanized rubber to place it under the desired mass tension. This last-named step is not absolutely essential to my invention, however.

Figure 4:
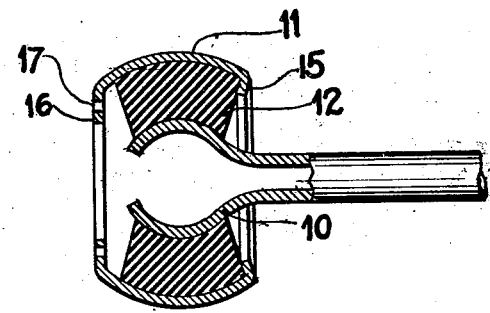
Fig. 4 illustrates the finished article after the turning operation.

I will first describe the finished article of Fig. 4. The reference character 10 designates an inner globular member which may be integral with the shaft or connected thereto by any suitable means. 11 is a tubular metal shell which is preferably of circular section and longitudinally curved. The shell 11 is spaced from the member 10, as shown in Fig. 4, and presents an inner surface which is transversely substantially concentric with the outer surface of the globular member 10. A sleeve 12 of distortable material, such for example, as live rubber, occupies the space between the member 10 and the sleeve 11, and is bonded to these members by vulcanizing to effect a driving connection therebetween. This gives improved coacting driving surfaces between the respective parts of the joint. The shell 11 has a flange 15 turned over the inner end of the rubber sleeve and a flange 16 which is turned downwardly beyond the outer end of the sleeve and provided with bolt holes, as indicated at 17.

In the manufacture of this joint a vulcanizing mold 14 is provided having a cylindrical opening 23 to receive the members of the joint. The mold is provided with a circular groove 24 below the opening 23 which constitutes an extension of the opening and receives an end of the shell 11. The shell 11 is preferably of substantially cylindrical form when it is inserted in the mold. A cover plate 13 is provided for the mold. This cover plate may be of continuous cross section or it may be axially divided. In case the globular member 10 of the joint is made integrally with the shaft to which it is connected, the cover plate 13 is preferably of divided form for convenience in the assembly of these parts. This cover plate is provided with a tapered projection 25 at its lower end which is adapted to enter the upper end of the shell 11 when assembled with the mold 14.

Figure 1:
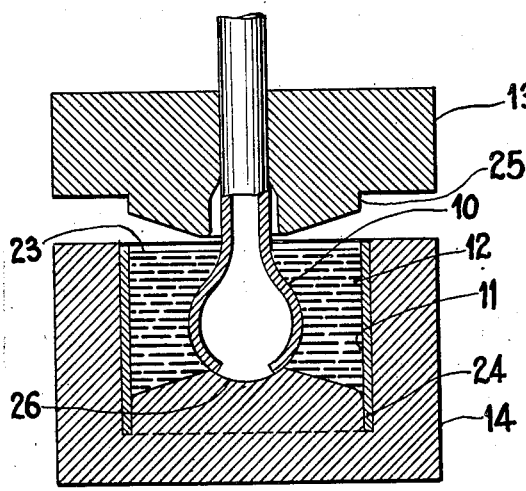
Fig. 1 is a sectional view illustrating the first step of manufacture of my joint.
Figure 2:
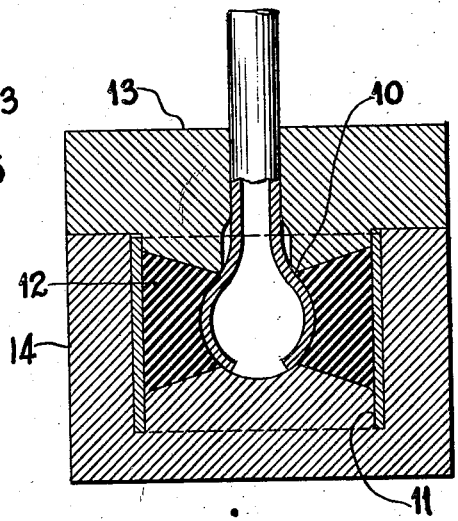
Fig. 2 is a similar view illustrating a further step.

In the assembly of the parts, the shell 11 is first inserted in the mold and the globular member 10 is next assembled with the mold with its head seated against a spherical seat 26 of the mold. The space between the shell 11 and the globular member 10 is then filled with raw rubber as indicated at 12. The cover plate 13 is next brought down over the assembled parts and forces the rubber into the shape shown in Fig. 2. The rubber is then vulcanized between the assembled parts after which the parts are removed from the mold.

Figure 3:
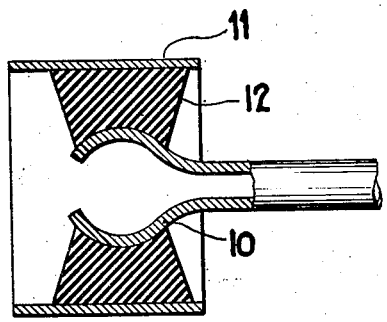
Fig. 3 shows the assembled parts after they are removed from the vulcanizing mold.

The parts of the joint now have the form shown in Fig. 3. The metal shell 11 may now be subjected to a suitable operation to change its shape to a generally spherical contour and at the same time form the flanges 15 and 16. The bolt holes 17 which constitute a connection between the flange 16 and a similar flange on one of the driving or driven shaft elements may be formed at this time or they may be formed in the shell before the assembly operations are commenced. The shaping of the shell may be done in any suitable manner, as for example, by spinning, die stamping, etc. The shaping of the shell gives the desired mass tension to the rubber sleeve by reason of the distortion of the rubber which naturally tends to conform to the shape in which it has been vulcanized. When the rubber is distorted from this natural shape by the shaping of the shell 11, it tends to return to the shape it has previously had. Being resisted in this attempt by its confinement within the reshaped shell, it exerts a considerable pressure upon the driving and driven members of the joint thus enhancing the driving bond produced by the vulcanizing step.

While I have shown the assembly of the elements of my joint in a vulcanizing mold before the outer shell is given its final shape, it will, of course, be obvious that this is not essential to the practice of my invention as this part might be given to its final shape before the vulcanizing process has begun. I have described a universal joint as having a live rubber connecting medium, but I do not wish to be limited to this medium as another suitable distortable resilient medium might be substituted.

It will be obvious to those skilled in the art that I have provided a superior method of assembling and forming parts of a universal joint and that I have produced a superior universal joint by this method of assembly.

The vulcanizing of the rubber bonds it most strongly to the surfaces with which it contacts. Any known method of preparing the surfaces for such bonding may be used. One well known method consists in coating the steel surfaces with a flux before vulcanizing. Such method gives a strength of bond superior to the strength of the rubber mass itself. Yet other methods are known.

It will be apparent too, that the parts of my joint are really parts of the mold during the vulcanizing. Actually they are the inner linings of the mold and constitute its side walls. Such use of them constitutes a part of my method at large.

No claim is made herein to the structure of the joint itself comprising inner and outer spherical members having a rubber bushing confined between them as this is claimed in my prior copending application above identified.

I desire my disclosure to be interpreted in an illustrative rather than a limiting sense.

What I claim is:

1. A method of forming a shaft coupling which comprises assembling a shell, and an inner member with a filler of distortable resilient material occupying the space between said members and thereafter turning an end of one of said members toward the other of said members to place said distortable material in mass tension.

2. A method of forming a shaft coupling which includes assembling a substantially cylindrical shell and an inner member with a filler of distortable resilient material and thereafter turning the ends of the shell inwardly about said distortable material.

3. A method of forming a shaft coupling which includes assembling a substantially cylindrical shell and an inner member with a filler of rubber interposed therebetween, vulcanizing the interposed rubber and turning an end of the shell inwardly about said vulcanized rubber.

4. A method of forming a shaft coupling which includes assembling a substantially cylindrical shell and an inner member with a filler of rubber interposed therebetwen, vulcanizing the interposed rubber and turning the ends of the shell inwardly about said vulcanized rubber.

5. A method of forming a shaft coupling which includes assembling a shell and an inner member with a filler of rubber interposed therebetween, vulcanizing the interposed rubber and distorting one of said members to place the interposed rubber in mass tension.

6. The method of forming shaft couplings which consists in constructing one of the driving and driven members of deformable metal, interposing between them a distortable body of elastic material, and subsequent to such interposition turning the ends of the metal to adjust the mass tension of the elastic material.

In testimony whereof I hereunto affix my signature.

RALPH H. ROSENBERG.